United States Patent [19]

Dorgathen

[11] 4,209,403

[45] * Jun. 24, 1980

[54] MAGNETIC FILTER APPARATUS

[75] Inventor: Friedrich Dorgathen, Ratingen-Hösel, Fed. Rep. of Germany

[73] Assignee: Montanus Industrieanlagen GmbH, Essen, Fed. Rep. of Germany

[ * ] Notice: The portion of the term of this patent subsequent to Jun. 21, 1994, has been disclaimed.

[21] Appl. No.: 884,610

[22] Filed: Mar. 8, 1978

[30] Foreign Application Priority Data

Mar. 8, 1977 [DE] Fed. Rep. of Germany ....... 2710005

[51] Int. Cl.2 .............................................. B01D 35/06

[52] U.S. Cl. .................................... 210/222; 210/396; 210/400; 210/526

[58] Field of Search ............... 210/222, 223, 106, 107, 210/400, 251, 526, 396, 161, 408; 209/218, 228, 229, 230

[56] References Cited

U.S. PATENT DOCUMENTS

| | | | |
|---|---|---|---|
| 1,188,340 | 6/1916 | Tark | 210/161 X |
| 2,471,044 | 5/1949 | Scrivener | 210/222 |
| 2,759,606 | 8/1956 | Nippert | 210/222 |
| 2,822,089 | 2/1958 | Woodruff | 210/222 X |
| 3,357,559 | 12/1967 | Israelson | 210/223 X |
| 3,428,179 | 2/1969 | Boyd, Jr. | 209/218 |
| 3,537,586 | 11/1970 | Hunlteler | 210/222 |
| 3,712,472 | 1/1973 | Elliott | 210/222 |
| 3,985,647 | 10/1976 | Smith | 209/218 |
| 4,031,011 | 6/1977 | Dorgathen | 210/222 |

*Primary Examiner*—Theodore A. Granger
*Attorney, Agent, or Firm*—John J. Dennemeyer

[57] ABSTRACT

Magnetic filter apparatus includes a liquid container, an inlet for liquid contaminated by magnetizable material, an outlet for purified liquid and a wall of magnetic bars disposed between the inlet and the outlet and having gaps therebetween for the passage of liquid. The magnetic bars are carried by an endless conveyor. An improved cleaning device is provided for cleaning the magnetic bars above the level of the liquid outlet. The improved cleaning device has wiper blades engageable with the magnetic bars. The wiper blades are mounted on endless conveyors arranged one to each side of the wall of magnetic bars. These endless conveyors are inclined obliquely across the wall of magnetic bars. This disposition of the conveyors permits a continuous or nearly continuous operation of the apparatus by adjustment of the wiper blade conveyors such that their speed component in the direction of travel of the wall of magnetic bars is the same as the speed of travel of the conveyor carrying the wall of magnetic bars.

6 Claims, 5 Drawing Figures

MAGNETIC FILTER APPARATUS

This invention relates to magnetic filter apparatus, and is an improvement over my earlier U.S. Pat. No. 4,031,011.

My earlier U.S. Pat. No. 4,031,011 relates to a continuous magnetic filter apparatus with magnetic filter rods supported by endless conveyor chains or the like in a mutually parallel arrangement, and a liquid container for receiving contaminated liquid to be purified through which the filter rods are passed and then guided past a cleaning device outside the liquid, wherein the cleaning device comprises at least two dirt wipers which are supported by endless travelling pairs of chains above and below the travelling path of the magnetic filter rods and are guided rectilinearly thereby. Such a magnetic filter apparatus has the advantage that the liquid bath need not be emptied and cleaned from time to time because the filter rods are relieved of adherent dirt outside the bath by the rectilinearly guided dirt wipers. This filtering operation is described as continuous in my earlier U.S. Pat. No. 4,031,011, but the cleaning device of said patent is constructed so that the magnetic filter rods must be advanced in a stepwise manner, because they must stand still during the wiping process. The present invention provides an improved cleaning device arrangement, wherein the magnetic filter rods move continuously rather than stepwise.

In the construction according to the invention there is provided magnetic filter apparatus comprising a liquid container, an inlet for liquid contaminated by magnetisable material, an outlet for purified liquid, a wall of magnetic bars disposed between said inlet and said outlet and having gaps therebetween for the passage of liquid, a first endless conveyor carrying said wall of magnetic bars, and drive means for driving said conveyor, all arranged generally as shown in my prior U.S. Pat. No. 4,031,011, and a cleaning device for cleaning said magnetic bars above the level of said liquid outlet, said cleaning device comprising wiper blades engageable with the magnetic bars from opposite sides thereof and further driven endless conveyors one to each side of the wall of magnetic bars and each carrying at least one of said wiper blades for rectilinear movement, wherein said further endless conveyors are inclined obliquely across the wall of magnetic bars at an angle $\alpha$, relative to the longitudinal axes of the magnetic bars, said first and further endless conveyors being adjusted relative to each other so that the speed component of said wiper blades in the direction of travel of the first conveyor is synchronised with the speed of travel of the first conveyor.

Preferably, the drive for the further endless conveyors is derived from the drive for the first endless conveyor and a reduction gear having a fixed reduction ratio ($1 : \sin\alpha$) is interposed between the drive and the first endless conveyor.

The apparatus according to this aspect of the invention wherein a common drive is utilized preferably includes a common driving motor, a steplessly controllable gear associated with said motor, two sprocket wheels mounted on a main drive shaft of the motor, a first sprocket wheel of which drives by way of a driving link chain sprocket wheels which are mounted on the drive shafts of the chain pairs for the wiper blades and which extend inclined at an oblique angle ($\alpha$) relative to the main shaft and the angular position of the sprocket wheels relatively to the main drive shaft is absorbed by the play of the links of the driving link chain, whereas the second sprocket wheel of the main drive shaft is connected to an angle drive for driving a drive shaft of the main conveyor chains for the magnetic filter rods.

Preferably, the drive link chain is also guided past a sprocket wheel of a support roller of a belt conveyor which is disposed below the cleaning device and serves as a dirt discharge device.

The invention will now be further described by way of example only with reference to the accompanying drawings, in which.

DESCRIPTION OF THE PREFERRED EMBODIMENT

Figure 1:
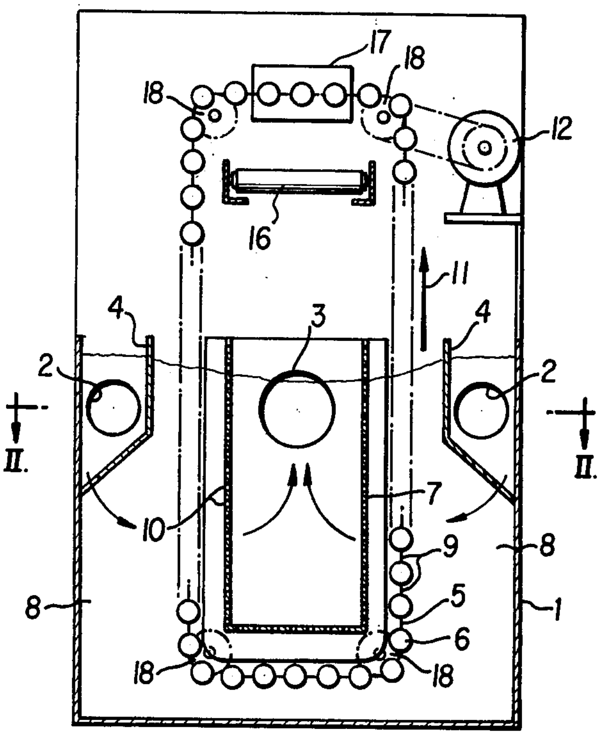
FIG. 1 is a diagrammatic, vertical sectional view through a magnetic filter apparatus incorporating the improved cleaning device of the present invention.

Referring now to FIG. 1 of the drawings, a magnetic filter apparatus is shown that is essentially like that described in my prior U.S. Pat. No. 4,031,011, except that it utilizes the improved cleaning device of the present invention. The reference numbers employed in the present drawings are identical to those employed in my prior U.S. Pat. No. 4,031,011 for comparable elements, and in FIG. 1 a container is indicated at 1 having at opposite sides thereof liquid inlets 2 through which liquid flows into respective distributors 4. Suspended in the container 1 is a collecting vessel 7 provided with an outlet 3, the floor and a pair of opposed side walls of the collecting vessel 7 having holes 10 therein. As is best seen in FIG. 2, the perforated side walls of the vessel 7 are interconnected by a further pair of side walls which extend outwardly beyond the perforated side walls into the vicinity of magnetic bars 6.

The magnetic bars 6 are carried by and extend between two endless conveyor chains 5, which are guided by rollers 18 in a generally rectangular path around the vessel 7. The bars 6 are mutually parallel and have gaps 9 therebetween, and one of the rollers 18 is connected to a drive motor 12 in a manner to be described later herein.

The top run of magnetic bars 6 passes through the improved cleaning device 17 of the invention, below which is located a discharge conveyor 16. The improved cleaning device 17 includes top and bottom endless chains 13 which define therebetween a gap in which the magnetic bars 6 are received as such are moved by their endless conveyor chains 5. The chains 13 extend generally lengthwise of the bars 6 and carry wipers or scrapers 14. At least one pair of scrapers 14 is provided on each chain 13 positioned 180° out of phase with each other. Each scraper 14 is of generally rectangular shape, with semicircular recesses 14a formed along the edge thereof remote from the respective chain 13, as shown in FIG. 5.

Figure 2:
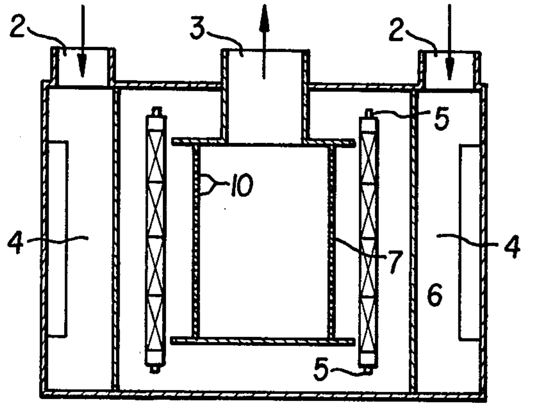
FIG. 2 is a horizontal sectional view taken along the line II—II of FIG. 1.
Figure 5:
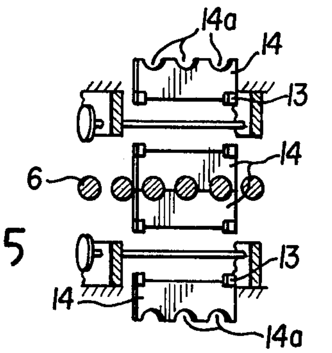
FIG. 5 is a sectional view taken along the line III—III in FIG. 4 and showing the semicircular recesses in the upper and lower scrapers.
Figure 3:
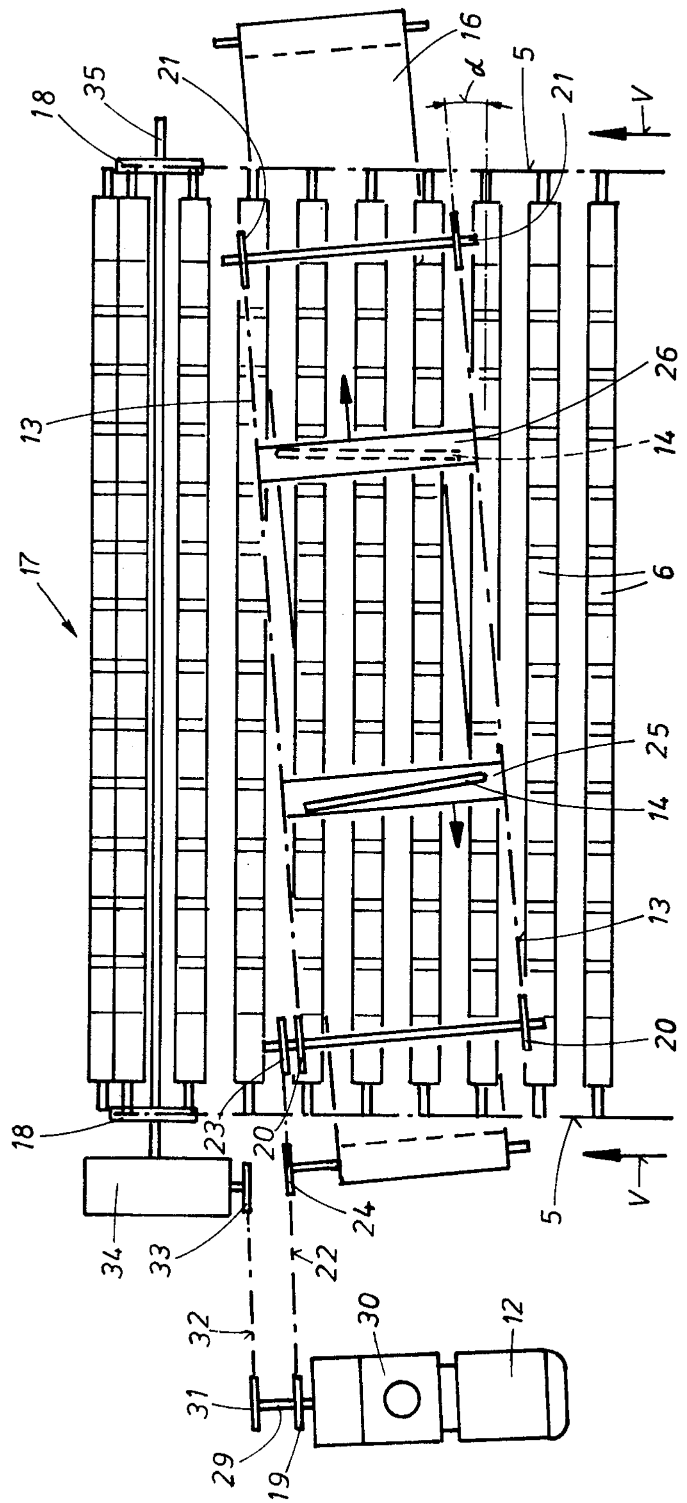
FIG. 3 is a diagrammatic plan view of the improved filter apparatus of the present invention.
Figure 4:
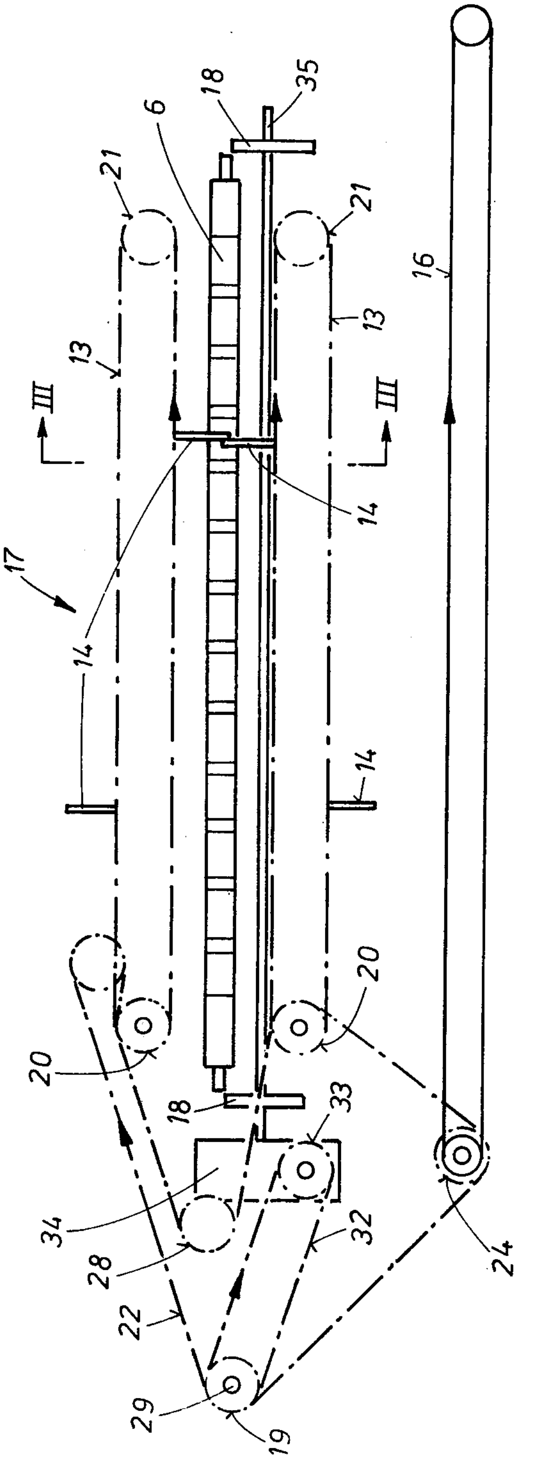
FIG. 4 is a diagrammatic side view of the improved filter apparatus, taken in the direction of the arrows V-V in FIG. 3.

Reference is now made to FIGS. 3–5, wherein is illustrated the improved cleaning device of the present invention for use in the magnetic filter apparatus of FIGS. 1 and 2.

There may be seen in FIG. 3 some of the horizontally guided magnetic filter rods 6 which are supported by endless main conveyor chains 5 and are guided downwardly by sprocket wheels 18, in order to dip into the liquid bath. The endless chains 13 are guided around pairs of diverter wheels 20, 21 above and below the horizontal movement path of the filter rods 6 (FIG. 4) the sprocket wheels 20 thereof being driven by the motor drive 12 by means of a driving chain 22 and a respective driving wheel 23; the main drive shaft 29 of the motor drive 12 supports a first sprocket wheel 19. The driving chain 22 drives also by way of a sprocket wheel 24 a support roller of the dirt discharge device 16 which is constructed in the form of a belt conveyor. An idle guide roller in FIG. 4 is denoted by 28.

The drive for the main conveyor chains 5 for the filter rods 6 is likewise effected by the common driving motor 12 which is associated with a steplessly controllable gear 30. In addition to the sprocket wheel 19 for the cleaning device, the main drive shaft 29 of the common drive supports a second sprocket wheel 31 which drives by way of a chain 32 and a sprocket wheel 33 a step-up gear 34 which is constructed as an angle drive and which has a fixed step-down ratio, from which the chain shaft 35 supporting the guide wheels 18 is driven.

Each endless chain pair 13 supports two cross members 25, 26 arranged at the same spacing one from the other, as supports for the dirt wipers 14 which, as has been noted, are provided with three semi-circular recesses 14*a* for simultaneously wiping three filter rods 6, as described in my earlier patent. The continuous throughpassage aimed at within the scope of the invention, of all conveyor chains permits, however, in contrast to the teaching of my earlier patent, each chain pair 13 to support more than two dirt wipers 14.

When the direction of advance of the magnetic filter rods 6 to be cleaned extends in the direction of the arrow V (FIG. 3), the axes of the guide wheels 20 or 21 for the endless chains 13 are positioned obliquely relatively to the direction of advance V in such a manner that the chain trains 13 form an angle $\alpha$ of small magnitude with the longitudinal axis of a filter rod 6. The significance of this oblique position angle will be referred to below.

In the illustrated constructional example, the upper dirt wiper 14 which is supported by the cross member 26 and which moves to the right in the direction of the arrow, is performing a wiping action, since this dirt wiper is supported by the lower run of a chain pair 13. It may be recognised that this dirt wiper 14 is positioned obliquely in respect of its cross member 26 in such a manner that it extends obliquely in respect of the mutually parallel filter rods 6 during the wiping process, and generally perpendicular to the axes of the filter rods 6 which it engages, as shown in FIG. 3. Conversely this oblique position of the dirt wipers is illustrated also for the cross member 25, moved to the left, of the upper run of the chain pair 13 (FIG. 3).

Taking into account the common drive for the two chain systems 5 and 13, and the fact that the sprocket wheels 19, 24 and 31, 33 of the two systems are arranged in a mutually nonparallel manner because of the oblique position angle $\alpha$, there results the demand that the oblique position angle $\alpha$ must only have a magnitude such that the angular position of the sprocket wheels one to the other can be absorbed by the play of the members of the driving chain 22 (under certain circumstances partly also of the link chain 32). It is known that every link chain may be bent slightly transversely to its longitudinal direction, a fact which is utilised for the common drive of the two chain systems by means of link chains.

A further condition for the magnitude of the oblique position angle $\alpha$ is coupled with the speed conditions of the dirt wipers on the one hand and the magnetic filter rods on the other hand. The drives of the two chain systems must be so adjusted to each other that the speed component of the dirt wiper or wipers taking part in the wiping process in the direction of the movement of the filter rods is equal to the advancing speed of the latter. When this condition is adjusted, for which purpose a common drive for the two chain systems 5 and 13 is not absolutely necessary, the recesses in the dirt wipers 14 which move from the left to the right during wiping, correspond always with the slowly advanced magnetic filter rods 6. The advancing speeds for the dirt wipers and the magnetic filter rods must therefore be in the ratio 1:sin $\alpha$.

This speed ratio is rigidly adjusted in the step-down ratio of the angle drive 34, if a common drive for the two chain systems is provided.

While the preferred embodiment of the invention utilizes a single motor 12 to drive both the endless chains 5 and the endless chains 13, as has been noted, it is not absolutely necessary that such a common drive be employed. Rather, it is possible to drive the endless chains 5 and their filter rods 6 with a motor separate from the motor used to drive the endless chains 13, with the drive speeds being controlled relative to each other so that the advancing speeds for the dirt wipers and the magnetic filter rods are established in the ratio 1:sin $\alpha$, in accordance with the teaching of the invention.

Obviously, variations in the invention are possible.

What is claimed is:

1. In a magnetic filter apparatus, including a liquid container having an inlet for admitting liquid contaminated by magnetizable material and an outlet for discharging purified liquid, the combination of:

a wall of spaced, parallel magnetic filter bars disposed between said inlet and said outlet, and having gaps therebetween for the passage of liquid;

a first endless conveyor arranged to be movable along a first path, and carrying said wall of magnetic filter bars, the longitudinal axes of said filter bars extending generally perpendicular to said first path;

first drive means arranged and operable for driving said first endless conveyor along said first path; and a cleaning device for cleaning said magnetic filter bars, said cleaning device being disposed above the level of said liquid outlet, and said first endless conveyor being arranged to move said magnetic filter bars first through said contaminated liquid and then through said cleaning device, said cleaning device comprising:

second and third, superimposed endless conveyor means disposed on opposite sides of said wall of magnetic filter bars, and arranged to be movable along second and third paths, respectively;

at least one scraper blade carried by each of said second and said third endless conveyor means, adapted to be engageable with said magnetic filter bars for removing contaminated material therefrom;

said second and said third paths extending obliquely across said first path, and forming an angle with respect to the longitudinal axes of said magnetic filter bars carried by said first endless conveyor means; and second drive means arranged and operable for driving said second and said third endless conveyor means for moving said scraper blades along said magnetic filter bars, while said filter bars are being moved along said first path by said first drive means;

said first drive means and said second drive means being arranged and synchronized so that the advancing speeds for said scraper blades and for said magnetic filter rods are in the ratio 1:sin $\alpha$.

2. In a magnetic filter apparatus as recited in claim 1, wherein said first drive means and said second drive means include a common drive motor, and wherein said first drive means is connected with said common drive motor through a reduction gear having a fixed reduction ratio of 1:sin $\alpha$.

3. In a magnetic filter apparatus as recited in claim 2, including additionally:

conveyor means positioned below said cleaning device, and arranged to be driven by said common drive motor.

4. In a magnetic filter apparatus as recited in claim 2, wherein said common drive motor includes a steplessly controllable gear and an output shaft, said output shaft carrying two sprocket drive wheels, said first drive means including a shaft connected with said first endless conveyor and with said reduction gear, said reduction gear being connected to be driven by a first one of said two sprocket drive wheels; and said second drive means including a shaft connected with said second and said third endless conveyor means, and carrying a sprocket wheel thereon, said sprocket wheel of said second drive means being connected with the second one of said two sprocket drive wheels by a drive chain.

5. In a magnetic filter apparatus as recited in claim 1, wherein said scraper blades are arranged to extend generally perpendicular to the axes of said magnetic filter bars when they are in engagement therewith.

6. In a magnetic filter apparatus as recited in claim 5, wherein the edges of said scraper blades facing said filter bars have recesses therein to receive said filter bars.

* * * * *